United States Patent [19]
Hashimoto

[11] Patent Number: 5,478,611
[45] Date of Patent: Dec. 26, 1995

[54] GLASS SUBSTRATE FOR LIQUID CRYSTALS, COLOR FILTER FOR TFT LIQUID CRYSTALS, TFT LIQUID-CRYSTAL DISPLAY FOR PROJECTION, AND COLOR TFT LIQUID-CRYSTAL DISPLAY

[75] Inventor: Takao Hashimoto, Kyoto, Japan

[73] Assignee: Nissha Printing Co., Ltd., Kyoto, Japan

[21] Appl. No.: 244,838

[22] PCT Filed: Oct. 6, 1993

[86] PCT No.: PCT/JP93/01436

§ 371 Date: Jun. 10, 1994

§ 102(e) Date: Jun. 10, 1994

[87] PCT Pub. No.: WO94/09394

PCT Pub. Date: Apr. 28, 1994

[30] Foreign Application Priority Data

Oct. 12, 1992 [JP] Japan .................... 4-300324

[51] Int. Cl.$^6$ .............. C23C 18/08; G02F 1/13
[52] U.S. Cl. .............. 428/1; 359/59; 359/66; 359/68; 428/426; 428/432
[58] Field of Search ............... 428/1, 426, 432; 359/66, 68, 59; 340/790, 792

[56] References Cited

FOREIGN PATENT DOCUMENTS

| | | |
|---|---|---|
| 172222 | 7/1988 | Japan . |
| 302223 | 12/1989 | Japan . |
| 30140 | 2/1992 | Japan . |

OTHER PUBLICATIONS

Patent Abstracts of Japan, vol. 14, No. 94 (P–1010), Feb. 21, 1990 & JP–A–01 302 223 (Nissha Printing), Dec. 6, 1989 & Database WPI Week 9004, Derwent Publications Ltd., London, GB; AN 90–025334.

Patent Abstracts of Japan, vol. 13, No. 253 (P–883), Jun. 13, 1989 & JP–A–01 052 156 (Nippon Shashin Insa), Feb. 28, 1989 & Database WPI Week 8914, Derwent Publications Ltd., London, GB; AN 89–104652.

Patent Abstracts of Japan, vol. 13, No. 172 (P–862), Apr. 24, 1989 & JP–A–01 007 003 (Nissha Printing), Jan. 11, 1989.

Patent Abstracts of Japan, vol. 14, No. 48 (P–997), Jan. 29, 1990 & JP–A–01 277 804 (Seiko Epson), Nov. 8, 1989 & Database WPI Week 8951, Derwent Publicatons Ltd., London, GB; AN 89–373056.

Patent Abstracts of Japan, vol. 13, No. 443 (P–941), Oct. 5, 1989 & JP–A–01 170 901 (Nissha Printing), Jul. 6, 1989 & Database WPI Week 8933, Derwent Publications Ltd., London, GB; AN 89–237082.

*Primary Examiner*—Nasser Ahmad
*Attorney, Agent, or Firm*—Wenderoth, Lind & Ponack

[57] ABSTRACT

Glass substrate for liquid crystals to secure high-contrast TFT liquid crystal displays, color filters for TFT liquid crystals, TFT liquid crystal displays for projection, and color TFT liquid crystal displays are obtained, in which unnecessary light of the region other than PIXEL electrodes of the liquid crystal panel can be completely shielded, TFT optical leak current can be completely suppressed, and light reflection at the black matrix portion can be nearly completely depressed.

The glass substrate for liquid crystals of the present invention comprises a glass plate and a porous transparent active layer on said glass plate wherein said porous transparent active layer is prepared by hydrolyzing an organic metal compound represented by the general formula $M(OR_1)_m(OR_2)_n X_p Y_q$ to form a sol, and then coating the sol on said glass plate, followed by baking to form said porous transparent active coating layer, and the active coating layer contains therein black matrix having 6% or less of a total reflection ratio by seeing-through from the glass surface and 3.5 or higher of an optical density.

5 Claims, No Drawings

GLASS SUBSTRATE FOR LIQUID CRYSTALS, COLOR FILTER FOR TFT LIQUID CRYSTALS, TFT LIQUID-CRYSTAL DISPLAY FOR PROJECTION, AND COLOR TFT LIQUID-CRYSTAL DISPLAY

FIELD OF THE INVENTION

The present invention relates to a glass substrate for liquid crystals for obtaining high-contrast TFT (thin film transistor) liquid crystal displays, which can completely interrupt unnecessary light of an area other than PIXEL electrodes of the liquid crystal panel, suppress TFT optical leak current, and depress nearly completely light reflection at a black matrix section, as well as to color filters for TFT liquid crystals, TFT liquid crystal displays for projection, and color TFT liquid crystal displays using the glass substrate for liquid crystals.

BACKGROUND OF THE INVENTION

In a color filter used for liquid crystal displays, it has been recommended to form black matrix with light-shielding film for filling up the space between pixels to have high-contrast images. Examples of such black matrix generally include the following.

1. Using ink or photosensitizer containing black pigment, black matrix is formed in a portion to be shielded on a transparent substrate.

2. A metal thin film such as chromium is formed on the entire transparent substrate by sputtering or evaporation method, and thereafter resist to shield light is formed by applying photosensitive resist on the metal thin film, exposing through a mask, and developing, and unnecessary portions are removed by etching to form black matrix.

However, the black matrix of the above 1 can suppress reflection of black matrix from the glass surface but the film thickness must be increased in order to achieve satisfactory light shielding effects. When the black matrix is printed with ink, satisfactory film thickness is unable to be obtained and it is difficult to suppress TFT optical leak current. It cannot form fine black matrix, neither. When photosensitizer is used to increase the film thickness, light does not penetrate inside the film which remains unexposed, due to the black color of the photosensitizer. When it is intended to achieve an optical density of 3.5 or higher, the black matrix film is too thick to maintain smoothness and becomes inadequate for assembling liquid crystal panels.

The black matrix of the above 2 is formed by evaporation or sputtering method, but because these have metallic luster, reflection of black matrix when seen from the glass surface is extremely large as 59%, causing the panel contrast to markedly lower. In addition, these forming methods require expensive vacuum equipment, and if optical density exceeding 3.5 is intended to achieve, long-term treatment is required, resulting in extremely poor productivity and high costs.

Consequently, the object of the present invention is to solve the problems described above and to provide glass substrate for liquid crystals with the total reflection ratio of 6% or less by seeing through from the glass surface and optical density of 3.5 or higher as well as color filters for TFT liquid crystals, TFT liquid crystal displays for projection, and color TFT liquid crystal displays using the glass substrate for liquid crystals.

DETAILED DESCRIPTION OF THE INVENTION

The present invention provides a glass substrate for liquid crystals, comprising a glass plate and a porous transparent active layer on the glass plate wherein said porous transparent active layer is prepared by hydrolyzing an organic metal compound represented by the general formula $M(OR_1)_m(OR_2)_nX_pY_q$ wherein M denotes at least one element selected from a group consisting of magnesium, calcium, zirconium, titanium, hafnium, germanium, yttrium, indium, aluminum, gallium, tin, and silicon, $R_1$ and $R_2$, the same or different, denote a hydrogen atom, an alkyl group, or an acyl group, X and Y, the same or different, denote a hydrogen atom, a chlorine atom, or a hydroxyl group, m, n, p, q stand for integers of 0 to 8, and m+n+p+q is equal to the valence of M, to form a sol, and then coating the sol on the glass plate, followed by baking to form said porous transparent active coating layer, and the active coating layer contains therein black matrix having 6% or less of a total reflection ratio by seeing-through from the glass surface and 3.5 or higher of an optical density.

In the glass substrate for liquid crystals of the present invention, the metal may be selected from the group consisting of tin, nickel, cobalt, copper, silver and gold.

The color filter for TFT liquid crystals may be designed to have a color layer formed on the above glass substrate for liquid crystals.

The TFT liquid crystal displays for projection may be designed to be assembled with the glass substrate for liquid crystals.

The color TFT liquid crystal displays may be designed to be assembled with the above color filter for TFT liquid crystals.

Now the present invention will be described in detail hereinafter. First of all, the organic metal compound expressed by the general formula $M(OR_1)_m(OR_2)_nX_pY_q$ is hydrolyzed to bring it to a sol form. In the general formula, M indicates at least one element selected from a group consisting of magnesium, calcium, zirconium, titanium, hafnium, germanium, yttrium, indium, aluminum, gallium, tin, and silicon. $R_1$ and $R_2$ show a hydrogen atom, an alkyl group (preferably carbon number of 1 to 6), or an acyl group (preferably carbon number of 1 to 6), respectively, and they may be the same or different. X and Y denote a hydrogen atom, a chlorine atom, or a hydroxyl group, respectively, and they may be the same or different. The m, n, p, q stand for integers of 0 to 8, and m+n+p+q is equal to the valence of M. Examples of organic metal compounds shown with the general formula include tetraethylsilicate, aluminum triisopropoxide, titanium tetrabutoxide, zirconium tetrabutoxide, or partial hydrolysates thereof.

This sol is applied on the transparent substrate, dried, and baked to form a porous transparent active film. The sol contains a required volume of water, hydrolysis catalyst such as hydrochloric acid, sulfuric acid, nitric acid, acetic acid, etc. and an alcohol. Examples of methods for applying this sol to the transparent substrate include bar coating, roll coating, spin coating, and dip coating methods.

For the transparent substrate, those used for display substrate devices of liquid crystal displays are used. For example, aluminosilicate glass, borosilicate glass, soda lime glass coated with silicon dioxide can be used.

The baking temperature depends on the kind of metal of M in the general formula but is selected within a temperature range from 300° C. to a temperature that the transparent substrate is thermally deformed.

The film formed above becomes a porous active film which is transparent and has a large number of fine holes having a size of about a few nm to 100 nm. The thickness of this film is 0.5–10 pm, preferably 0.8–5 μm.

The transparent substrate having the porous transparent active film thereon is dipped in a solution containing a reducing agent. For reducing agents, stannous chloride, stannous chloride-palladium chloride, potassium sodium tartarate, boron hydride compounds, sodium hypophosphite, hydrazine, formaldehyde, etc. are exemplified.

After allowing the reducing agents to be thoroughly absorbed in the porous fine holes, the transparent substrate is immersed in a solution containing metallic ions which are precipitated as colloid. The pH of the solution in which the reducing agents and metallic ions are dissolved depends on the metals used. The metal used is selected from nickel, tin, copper, silver, gold, cobalt, etc. Immersing the transparent substrate in the solution containing the metal ions causes metal ions to come in contact with previously absorbed reducing agents inside the fine holes having a few nm to 100 nm and generates the following reactions inside the fine holes, and metal is precipitated in the fine holes. The metal precipitated inside fine holes is unable to form uniform metal film but forms colloidal particles to exhibit perfect black color free from metal luster.

$$R + H_2O \rightarrow Ox + H^+ + e^-$$

$$M^{n+} + ne^- \rightarrow M^0 \text{ or } 2H^+ + 2e^- \rightarrow H_2$$

(where R is a reducing agent and M is metal).

The black metal colloidal particle is filled in a volume having a fine pore size of a few nm to 100 nm and a thickness of 0.8 to 5 μm, and consequently, this transparent substrate can become glass substrate with black film, which provides a total reflection ratio of 6% or less by seeing through from the glass surface and an optical density of 3.5 or higher. Utilizing the black film of the glass substrate having these features for black matrix, unnecessary light of an area other than liquid crystal panel PIXEL electrodes is completely interrupted, a TFT optical leak current is completely suppressed, and light reflection of the black matrix portion is nearly completely suppressed, and therefore, high-contrast color filters, TFT liquid crystal displays for projection, and color TFT liquid crystal displays which have never existed before can be obtained.

As mentioned above, a black film is formed on the glass plate, and then patterned by an art-known method as follows.

1. The black film formed throughout on the surface of the transparent plate is coated with a photoresist which is then exposed to light through a mask, and developed to form a resist film on a portion to be light-shielded. The other portion of the black film, which is not covered with the resist film, is etched to remove the black metal colloid particles to form a glass substrate for liquid crystal displays of the present invention.

2. The black film formed throughout on the surface of the transparent plate is coated with a photoresist which is then exposed to light through a mask, and developed to form a resist film on a portion to be light-shielded. The other portion of the black film, which is not covered with the resist film, is etched to remove the black metal colloid particles as well as the porous film to form a glass substrate for liquid crystal displays of the present invention.

3. The porous transparent active film, which has been formed on a glass plate, is coated with a photoresist which is then exposed to light through a mask and developed to form a resist film on a portion other than light-shielding. The exposed portion to be light-shielded is treated with the above mentioned reducing agent to absorb therein and then dipped in a metal ion solution to precipitate metal colloid particles. Thereafter, the unnecessary photoresist film is removed to form a glass substrate for liquid crystal.

It is possible to apply a protective film to the glass substrate for liquid crystals. The protective film is employed to protect the glass substrate for liquid crystals from various chemicals to which the glass substrate is subjected during the process to produce color filters and liquid crystal displays or to improve adhesion when transparent electrodes are provided on the glass substrate for liquid crystals. For the protective film, either inorganic coating film or organic coating film may be used. For the inorganic coating film, silica, zirconium oxide, etc. may be applied and baked by a sol-gel process or provided by sputtering or evaporation method. For the organic coating film, acrylic resin, silicone resin, epoxy resin, etc. may be coated and baked.

It is possible to select the most suitable glass substrate for liquid crystals from among the above three types of black matrix and manufacture high-contrast color filters according to the manufacturing method of color filters. Color filters fabricated by applying the known processes, such as pigment dispersion, coloring, electrodeposition, micelle electrolysis, printing, etc. all provide a total reflection ratio of 6% or lower by seeing through from the glass surface and an optical density of 3.5 or higher. Applying these color filters has enabled complete shielding of unnecessary light of the area other than PIXEL electrodes of liquid crystal panels, complete suppression of TFT optical leak current, and prevention of reflected images by depressing nearly all light reflections at the black matrix portion, thereby materializing high-contrast color TFT liquid crystal displays which have never been available.

When the glass substrate for liquid crystals of the present invention is used for liquid crystal displays for projection, it is desirable to use black matrix substrate with optical density of 4.5 or higher for black matrix. This is because in the case of projection, the light source used for back light is extremely intense and at the same time the back light is generally irradiated from the side of the substrate with black matrix, causing even a slight light leak to generate TFT optical leak current and resulting in lowered contrast and maloperation of TFT.

EXAMPLE 1

The transparent sol liquid obtained by hydrolyzing and condensing aluminum isopropoxide was spin-coated using a spin coater on a cleaned and dried borosilicate glass substrate. After drying at 70° C., a film 1.5 μm thick was obtained. Next, the substrate was baked at 470° C. for 3 hours to obtain a glass substrate with 1.2-μm-thick porous transparent active film.

This substrate was immersed for 5 minutes in a solution in which a reducing agent of the following composition was dissolved.

Stannous chloride 5 parts

36% Hydrochloric acid 20 parts

Extra pure water 75 parts

After rinsing with water and drying, the substrate was immersed for 10 minutes with oscillating at 60 ° C. in a solution containing dissolved metallic ion of the following composition.

Silver nitrate 3 parts

Aqueous ammonia proper amount

N-methylolamine 10 parts

Water remainder (100 parts in total)

Then, rinsing with water and drying resulted in a glass substrate with black film.

Next, this film was compared with a conventional chromium film having a thickness of 1,500 Å, and a resin film prepared by dispersing black pigment in a photosensitive agent and then coating (film thickness 3 μm, commercially available from Fuji Hunt Electronics). The results are shown as follows. Measurement was carried out from the glass surface and the values contain glass reflection.

| Reflection ratio and optical density | Invented film | Chromium film | Resin |
| --- | --- | --- | --- |
| Integrating sphere reflection ratio (400–700 nm) | 3% | 59% | 5% |
| 45°–45° reflectance | 5% | 58% | 8% |
| Optical density | 5 or higher | 3.0 | 2.8 |

The above data clearly indicates that the black film of the present invention provides low reflectance and high optical density.

Next, to the entire surface of the black film of the glass substrate, a positive resist (commercially available from Tokyo Oka as OFPR-800) was spin-coated in a thickness of 1.5 μm and baked for 20 minutes at 100° C. in a clean oven. Then, the glass substrate was exposed to light via a photomask for TFT and alkali-developed, and resist was formed on the black matrix portion. The glass substrate was dipped for 4 minutes in the 40 ° C. treatment liquid of the following composition and metallic colloidal particles were removed.

64% Nitric acid 15 parts

95% Phosphoric acid 21 parts

Pure water 64 parts

Then, unnecessary resist film was alkali-peeled, rinsed with water, and dried. Finally, the glass substrate for liquid crystals with fine black matrix patterns was obtained.

EXAMPLE 2

To the glass substrate for liquid crystals obtained in Example 1, the sensitizer dispersing a blue pigment therein was coated, and the substrate was exposed to light through a photomask and developed, and a blue relief was obtained. In the similar manner, a red and a green reliefs were provided at the portions other than black matrix, respectively, to which protective film was coated, and the pigment color filter was obtained. The black matrix of this color filter reproduced the data of Example 1 as it is.

EXAMPLE 3

To the glass substrate for liquid crystals obtained in Example 1, silica was coated by 800 Å sputtering, then an ITO film was coated at 1400 Å, to obtain a glass substrate with black matrix and ITO film having a sheet resistance of 30 Ω/□ was obtained. This substrate was combined with the substrate with a TFT circuit and a TFT display panel for projection was fabricated. This panel exhibited no TFT optical leak current when power was turned on.

EXAMPLE 4

A 13-inch glass substrate for liquid crystals fabricated in the manner same as Example 1 was obtained. In addition, the substrate was treated in the same manner as Example 2 to obtain a color filter. To this color filter, ITO film was provided and combining the substrate with the substrate with the TFT circuit, a 13-inch large-size TFT color display was fabricated. This display was nearly free from reflected images of surrounding lights even when the power was turned on in a bright location, and achieved a remarkably clear panel.

The glass substrate for liquid crystals of the present invention comprises a glass plate and a porous transparent active layer on said glass plate wherein the porous transparent active layer is prepared by hydrolyzing an organic metal compound represented by the general formula $M(OR_1)_m(OR_2)_nX_pY_q$ to form a sol, and then coating the sol on said glass plate, followed by baking to form said porous transparent active coating layer, and the active coating layer contains therein black matrix having 6% or less of a total reflection ratio by seeing-through from the glass surface and 3.5 or higher of an optical density.

Consequently, according to the present invention, because the black matrix has a total reflection ratio of 6% or less by seeing through from the glass surface and an optical density of 3.5 or higher, unnecessary light of the region other than PIXEL electrodes of the liquid crystal panel can be completely shielded, TFT optical leak current can be completely suppressed, and light reflection at the black matrix portion can be nearly completely depressed, and a high-contrast color filter, TFT liquid crystal display for projection, and color TFT liquid crystal display which have never been available to date can be obtained.

What is claimed is:

1. A glass substrate for liquid crystals, comprising a glass plate and a porous transparent active layer on said glass plate wherein said porous transparent active layer is prepared by hydrolyzing an organic metal compound represented by the general formula $M(OR_1)_m(OR_2)_nX_pY_q$ wherein M denotes at least one element selected from a group consisting of magnesium, calcium, zirconium, titanium, hafnium, germanium, yttrium, indium, aluminum, gallium, tin, and silicon, $R_1$ and $R_2$, the same or different, denote a hydrogen atom, an alkyl group, or an acyl group, X and Y, the same or different, denote a hydrogen atom, a chlorine atom, or a hydroxyl group, m, n, p, q stand for integers of 0 to 8, and m+n+p+q is equal to the valence of M, to form a sol, and then coating the sol on said glass plate, followed by baking to form said porous transparent active coating layer, and the active coating layer contains therein black matrix having 6% or less of a total reflection ratio by seeing-through from the glass surface and 5 or higher of an optical density.

2. A glass substrate for liquid crystals according to claim 1 wherein said black matrix is formed from a metal selected from the group consisting of tin, nickel, cobalt, copper, silver and gold.

3. A color filter for TFT liquid crystals characterized by a colored layer formed on the glass substrate for liquid crystals according to claim 1.

4. A TFT liquid crystal display for projection characterized by assembling the glass substrate for liquid crystals according to claim 1.

5. A color TFT liquid crystal display characterized by assembling the color filter of the TFT liquid crystals according to claim 3.

* * * * *